United States Patent
Bryant-Rich et al.

(10) Patent No.: US 8,943,409 B2
(45) Date of Patent: Jan. 27, 2015

(54) STORAGE DEVICE MANAGING PLAYABLE CONTENT

(75) Inventors: Donald Ray Bryant-Rich, Haifa (IL); Daniel Isaac Goodman, Beit Shemesh (IL); Judah Gamliel Hahn, Ofra (IL)

(73) Assignee: SanDisk IL Ltd., Kfar Saba (IL)

( * ) Notice: Subject to any disclaimer, the term of this patent is extended or adjusted under 35 U.S.C. 154(b) by 639 days.

(21) Appl. No.: 12/344,401

(22) Filed: Dec. 26, 2008

(65) Prior Publication Data

US 2010/0169780 A1    Jul. 1, 2010

(51) Int. Cl.
| | |
|---|---|
| G06F 3/00 | (2006.01) |
| G11B 27/32 | (2006.01) |
| G11B 27/00 | (2006.01) |
| G11B 27/10 | (2006.01) |
| G11B 27/34 | (2006.01) |
| H04N 9/82 | (2006.01) |
| H04N 5/775 | (2006.01) |
| H04N 5/85 | (2006.01) |

(52) U.S. Cl.
CPC ............ *G11B 27/329* (2013.01); *G11B 27/005* (2013.01); *G11B 27/105* (2013.01); *G11B 27/34* (2013.01); *H04N 9/8205* (2013.01); *G11B 2220/61* (2013.01); *H04N 5/775* (2013.01); *H04N 5/85* (2013.01)
USPC ........................................................ 715/719

(58) Field of Classification Search
USPC ........................................................ 715/719
See application file for complete search history.

(56) References Cited

U.S. PATENT DOCUMENTS

| | | |
|---|---|---|
| 5,931,947 A | 8/1999 | Burns et al. |
| 6,377,958 B1 | 4/2002 | Orcutt |
| 6,405,315 B1 | 6/2002 | Burns et al. |
| 6,438,705 B1 | 8/2002 | Chao et al. |
| 6,922,759 B1 | 7/2005 | Garritsen |
| 6,925,545 B2 | 8/2005 | March et al. |

(Continued)

FOREIGN PATENT DOCUMENTS

| | | |
|---|---|---|
| EP | 1536427 A1 | 6/2005 |
| EP | 1586988 A2 | 10/2005 |

(Continued)

OTHER PUBLICATIONS

International Search Report and Written Opinion of International Application No. PCT/US2009/062530, dated Feb. 3, 2010, 13 pages.

(Continued)

*Primary Examiner* — Ryan Pitaro
(74) *Attorney, Agent, or Firm* — Toler Law Group, PC

(57) ABSTRACT

Displaying storage device-generated menus for playback includes connecting a storage device to a host capable of playing back video content, and presenting to the host a root directory through which a content selection file allows selecting video files for playback through user-storage device interaction, and, optionally, one or more service files that provide various useful information that are also playable back through user-storage device interaction. This typically further includes displaying a Main Menu that represents these files and playing Main Menu items as regular video files/contents. While the content selection file is played back, a content selection menu is generated by the storage device and displayed by the host, and each content selection menu item is playable by transmitting a playback command to the storage device rather than to the host. A storage device is also provided, which uses such method.

21 Claims, 6 Drawing Sheets

(56) References Cited

U.S. PATENT DOCUMENTS

| | | | |
|---|---|---|---|
| 7,073,010 | B2 | 7/2006 | Chen et al. |
| 7,184,264 | B2 | 2/2007 | Le |
| 7,210,043 | B2 | 4/2007 | Miyazaki et al. |
| 7,272,606 | B2 | 9/2007 | Borthakur et al. |
| 7,272,613 | B2 | 9/2007 | Sim et al. |
| 7,512,979 | B1 | 3/2009 | Koike et al. |
| 7,620,618 | B2* | 11/2009 | Tsukamoto ........................ 1/1 |
| 7,778,972 | B1 | 8/2010 | Cormie et al. |
| 7,870,282 | B2* | 1/2011 | Jonsson et al. ............... 709/231 |
| 7,975,270 | B2 | 7/2011 | Ferri et al. |
| 8,015,584 | B2* | 9/2011 | Breen et al. .................... 725/86 |
| 8,166,067 | B2 | 4/2012 | Hahn |
| 8,239,395 | B2 | 8/2012 | Fruchter et al. |
| 2003/0180032 | A1 | 9/2003 | Barde et al. |
| 2004/0133650 | A1 | 7/2004 | Miloushev et al. |
| 2004/0133797 | A1 | 7/2004 | Arnold |
| 2004/0252967 | A1 | 12/2004 | Sheu et al. |
| 2005/0005044 | A1 | 1/2005 | Liu et al. |
| 2005/0033721 | A1 | 2/2005 | Cromer et al. |
| 2006/0064476 | A1 | 3/2006 | Decasper et al. |
| 2006/0101259 | A1 | 5/2006 | Chen |
| 2006/0107317 | A1 | 5/2006 | Moran et al. |
| 2006/0161754 | A1 | 7/2006 | Dewey et al. |
| 2007/0027873 | A1 | 2/2007 | Factor et al. |
| 2007/0050620 | A1 | 3/2007 | Pham et al. |
| 2007/0073747 | A1* | 3/2007 | Jung et al. ..................... 707/100 |
| 2007/0156842 | A1 | 7/2007 | Vermeulen et al. |
| 2007/0159528 | A1 | 7/2007 | Kikuchi et al. |
| 2007/0233957 | A1 | 10/2007 | Lev-Ran et al. |
| 2007/0240155 | A1 | 10/2007 | Shlomai |
| 2007/0247551 | A1 | 10/2007 | Raines |
| 2007/0250193 | A1 | 10/2007 | Raines et al. |
| 2007/0283094 | A1 | 12/2007 | Narayanaswami et al. |
| 2008/0005531 | A1 | 1/2008 | Praca |
| 2008/0034440 | A1 | 2/2008 | Holtzman et al. |
| 2008/0059743 | A1 | 3/2008 | Bychkov et al. |
| 2008/0098023 | A1 | 4/2008 | Araki et al. |
| 2008/0154921 | A1 | 6/2008 | Bauchot et al. |
| 2008/0163339 | A1 | 7/2008 | Janakiraman et al. |
| 2008/0215744 | A1* | 9/2008 | Shenfield ...................... 709/231 |
| 2008/0297656 | A1 | 12/2008 | Saito |
| 2009/0228520 | A1* | 9/2009 | Yahata et al. ............. 707/104.1 |
| 2009/0300710 | A1 | 12/2009 | Chai et al. |
| 2010/0017546 | A1 | 1/2010 | Poo et al. |
| 2010/0122332 | A1 | 5/2010 | Kamei et al. |
| 2010/0169395 | A1 | 7/2010 | Bryant-Rich et al. |
| 2010/0183277 | A1* | 7/2010 | Okada et al. .................... 386/47 |
| 2011/0295901 | A9 | 12/2011 | Tormasov |
| 2012/0271859 | A1 | 10/2012 | Fruchter et al. |

FOREIGN PATENT DOCUMENTS

| | | | |
|---|---|---|---|
| EP | 1650665 | A1 | 4/2006 |
| EP | 1998270 | A1 | 12/2008 |
| WO | 2007099012 | A1 | 9/2007 |

OTHER PUBLICATIONS

Rich, Donald. "Authentication in Transient Storage Device Attachments," IEEE Computer Society, vol. 40, No. 4, dated Apr. 2007, pp. 102-104.

Meter et al. "Derived Virtual Devices: A Secure Distributed File System Mechanism," In Proceedings of the Fifth NASA Goddard Space Flight Center Conference on Mass Storage Systems and Technologies, 1996, Citeseer, 20 pages.

Jansen et al. "Smart Cards and Mobile Device Authentication: An Overview and Implementation," National Institute of Standards and Technology (NIST), NISTIR 7206, dated Jul. 2005, 52 pages.

International Search Report and Written Opinion received from the International Searching Authority (EPO) for International Application No. PCT/US2009/062602, dated Jan. 27, 2010, 12 pages.

International Search Report and Written Opinion for International Application No. PCT/US2009/063269 received from the International Searching Authority (EPO), dated Jan. 27, 2010, 14 pages.

International Search Report and Written Opinion for International Application No. PCT/US2009/063260 received from the International Searching Authority (EPO), dated Feb. 11, 2010, 15 pages.

International Search Report and Written Opinion for International Application No. PCT/US2009/062530 received from the International Searching Authority (EPO), dated Feb. 3, 2010, 13 pages.

Requirement for Restriction/Election for U.S. Appl. No. 12/344,373 received from the United States Patent and Trademark Office (USPTO), dated Aug. 22, 2011, 6 pages.

Requirement for Restriction/Election for U.S. Appl. No. 12/344,389 received from the United States Patent and Trademark Office (USPTO), dated Jan. 6, 2011, 5 pages.

Non-Final Office Action for U.S. Appl. No. 12/344,389 received from the United States Patent and Trademark Office (USPTO), dated Feb. 8, 2011, 8 pages.

Final Office Action for U.S. Appl. No. 12/344,389 received from the United States Patent and Trademark Office (USPTO), dated Jul. 19, 2011, 11 pages.

Non-Final Office Action for U.S. Appl. No. 12/344,373 received from the United States Patent and Trademark Office (USPTO), dated Oct. 7, 2011, 16 pages.

Non-Final Office Action U.S. Appl. No. 12/344,389 received from the United States Patent and Trademark Office (USPTO), dated Dec. 16, 2011, 9 pages.

Notice of Allowance and Fees Due for U.S. Appl. No. 12/344,407 received from the United States Patent and Trademark Office (USPTO), dated Nov. 23, 2011, 11 pages.

"Ext2 Installable File System for Windows", www.fs-driver.org, printed Dec. 23, 2008, 6 pages.

Altaparmakov, Anton et al. "SfR Fresh"—the SfR Freeware/Shareware Archive, www.sfr-fresh.com, printed Dec. 23, 2008, copyright 2000-2005, 65 pages. (See lines 964-966 on p. 26).

Communication Pursuant to Article 94(3) EPC issued Apr. 29, 2013 in European Application No. 09756081.7, 5 pages.

Final Office Action mailed Jul. 20, 2012 in U.S. Appl. No. 12/344,389, 12 pages.

Communication Pursuant to Article 94(3) EPC issued Sep. 24, 2012 in European Application No. 09756089.0, 6 pages.

Non-Final Office Action mailed Oct. 22, 2012 in U.S. Appl. No. 13/541,342, 17 pages.

Communication Pursuant to Article 94(3) EPC issued Jul. 19, 2012 in European Application No. 09752257.7, 8 pages.

First Office Action mailed Sep. 21, 2012 in Chinese Application No. 200980148002.2, with English translation, 4 pages.

Communication pursuant to Article 94(3) EPC issued in European Application No. 09756081.7 on Apr. 12, 2012, 6 pages.

Office Action issued Jun. 24, 2013 in Chinese Application No. 200980148035.7, with English translation, 10 pages.

International Preliminary Report on Patentability for International Application No. PCT/US2009/062530, issued Jun. 29, 2011, 6 pages.

International Preliminary Report on Patentability for International Application No. PCT/US2009/062602, issued Jun. 29, 2011, 6 pages.

International Preliminary Report on Patentability for International Application No. PCT/US2009/063260, issued Jun. 29, 2011, 8 pages.

International Preliminary Report on Patentability for International Application No. PCT/US2009/063269, issued Jun. 29, 2011, 7 pages.

Notice of Allowance and Fee(s) Due mailed Mar. 2, 2012 in U.S. Appl. No. 12/344,407, 10 pages.

Notice of Allowance and Fee(s) Due mailed Apr. 4, 2012 in U.S. Appl. No. 12/344,373, 9 pages.

Final Office Action mailed Apr. 1, 2013 in U.S. Appl. No. 13/541,342, 19 pages.

Office Action issued Aug. 20, 2013 in Chinese Application No. 200980148004.1, with English translation, 5 pages.

Office Action issued Aug. 26, 2013 in Chinese Application No. 200980148031.9, with English translation, 9 pages.

Communication Pursuant to Article 94(3) EPC issued Sep. 16, 2013 in European Application No. 09756089.0, 5 pages.

Final Office Action mailed Sep. 30, 2013 in U.S. Appl. No. 12/344,389, 14 pages.

(56) References Cited

OTHER PUBLICATIONS

Communication Pursuant to Article 94(3) EPC issued Nov. 4, 2013 in European Application No. 09747978.6, 4 pages.
Final Office Action mailed Jan. 15, 2014 in U.S. Appl. No. 13/541,342, 23 pages.
Non-Final Office Action mailed Jun. 20, 2013 in U.S. Appl. No. 12/344,389, 14 pages.
First Office Action mailed Jan. 7, 2013 in Chinese Application No. 200980148004.1, with English translation, 7 pages.
First Office Action mailed Jan. 14, 2013 in Chinese Application No. 200980148031.9, with English translation, 8 pages.
Non-Final Office Action mailed Mar. 6, 2014 in U.S. Appl. No. 12/344,389, 14 pages.
Non-Final Office Action mailed Jun. 24, 2014 in U.S. Appl. No. 12/541,342, 6 pages.

\* cited by examiner

STORAGE DEVICE MANAGING PLAYABLE CONTENT

CROSS REFERENCE TO RELATED APPLICATIONS

This patent application is related to and incorporates by reference the patent applications entitled "DEVICE AND METHOD FOR FILTERING A FILE SYSTEM" Ser. No. 12/344,389, "METHOD AND APPARATUS FOR PROVIDING ACCESS TO FILES BASED ON USER IDENTITY" Ser. No. 12/344,407, and "A STORAGE DEVICE PRESENTING TO HOSTS ONLY FILES COMPATIBLE WITH A DEFINED HOST CAPABILITY" Ser. No. 12/344,373 in that each share a common inventor (Yehuda Hahn) and were all filed on the same day.

FIELD OF THE INVENTION

The present invention relates to storage devices. More particularly, the present invention relates to a storage device, such as a USB flash drive and the like, that is capable of providing content playable on hosts such as Digital Versatile Disc or Digital Video Disc ("DVD") players.

BACKGROUND OF THE INVENTION

DVD players and like systems render video content for display on display devices by generating video signals from the video content, which may be stored, for example, on a DVD Compact Disk ("CD"), and forwarding the video signals to a display device. More advanced DVD players also have a USB port through which USB flash drives ("UFDs") can provide video content.

A standard procedure used by a DVD player to read data stored on UFDs typically conforms to the USB specification and the FAT ("FAT" is an abbreviation of "File Allocation Table") file system standard (which is defined in the ISO/IEC 9293:1994 standard). According to this procedure, after the DVD player detects the presence of a UFD, for example upon connecting the UFD device to the DVD player, the DVD player requests the file system of the UFD device. Briefly, a file system is a methodology for storing and organizing computer files. A file system includes a set of abstract data files and metadata that are implemented for the storage, hierarchical organization, manipulation, navigation, access, and retrieval of data. The abstract data types and metadata form a "directory tree" through which the computer files (also referred to herein as "data files" or "files" for simplicity) can be accessed, manipulated, and launched. A "directory tree" typically includes a root directory and optional subdirectories. A directory tree is stored in the file system as a "directory file". The set of metadata and directory files included in a file system is called herein a "file system structure". A file system, therefore, includes data files and a file system structure that facilitates finding, accessing, manipulating and launching data files. FAT32, which is a file system using 32-bit FAT entries, is an exemplary file system with which UFD and similar devices can be provided.

DVD players use the file system and information pertaining to files stored on the UFD to generate video signals to display a content selection menu from which a user can select a file for playback. The playable files are displayed as a list of items, each item corresponding to a different selectable file. Because DVD players, and content players in general, use different proprietary menu generation mechanisms, the format and arrangement of the content selection menu generated by them is not standardized and highly manufacturer dependant. In addition, listed items are usually displayed to the user of the DVD player in an inflexible and unfriendly way. For example, if a TV series has many episodes, the respective video files corresponding to the episodes are usually given long similar file names (e.g., "Walking_on_the_moon_1", "Walking_on_the_moon_2", "Walking_on_the_moon_3", etc.). Some DVD players are incapable of handling many files and/or complex folder structures.

Although the DVD menu display standard allows graphical depiction of content selection menu and it provides a user interface for selecting them, the standard is limited to MPEG-2, for which reason it cannot be used with downloaded content from portable storage devices or to handle files that are stored on such devices.

It is with respect to these and other considerations that the present invention has been made.

SUMMARY

In view of the foregoing observations and the present needs, it would be advantageous to have a storage device that includes a menu generation mechanism that facilitates enhancing the way conventional DVD players display menus.

The storage device's menu generation mechanism presents a virtual root directory to a DVD player to prompt it to generate and display a DVD's main menu. The DVD's main menu includes one or more main menu items, one of which main menu items may correspond to or be associated with a content selection menu by which video files stored in a memory of the storage device can be selected for playback. The content selection menu includes content selection menu items, each of the content selection menu items referencing one of the video files in the storage device's memory.

The main menu is displayed on a display device connected to the DVD player by using the DVD's proprietary menu generation mechanism, and the content selection menu is selectable by a user of the DVD player by transmitting remote control commands to the DVD player. If the content selection menu is displayed on the display device, video files, which are referenced by the content selection menu items, are selectable by the user by transmitting remote control commands to the storage device rather then to the DVD player.

BRIEF DESCRIPTION OF THE DRAWINGS

For a better understanding of the various embodiments described herein, reference is made to the accompanying drawings, in which like numerals designate corresponding sections or elements throughout, and in which.

DETAILED DESCRIPTION OF PREFERRED EMBODIMENTS

The embodiments and various aspects thereof are further described in more details below. This description is not intended to limit the scope of claims but instead to provide examples of such embodiments. Typically, whenever it is said below that a menu item or item (the two terms are used herein interchangeably) is played back, this implies that a file referenced by this menu item or item is played back. In other words, saying that a menu item is played back and saying that a file referenced by the menu item is played back can be deemed as equivalents.

The traditional problem of using an unfriendly and inflexible selection menu to select video content in a storage device for playback by a traditional DVD player is mitigated by using a storage device that is capable of generating a content selection menu instead of, or in conjunction with, the traditional DVD player content menu. Because traditional DVD players use a proprietary menu mechanism that utilizes root directories of storage devices to generate and display corresponding main menus, the new storage device utilizes the DVD player's proprietary menu generation mechanism to initiate, or to commence, its own proprietary menu generation mechanism. In order to initiate or commence its own proprietary menu generation mechanism the new storage device presents to the DVD player a special root directory that is referred to hereinafter as a "virtual root directory". The new storage device uses the virtual root directory to present to the DVD player only specific file(s) which are content selection file and, optionally (depending on the use case), additional one or more files that are generally referred to herein as "service" files. Files such as "Help.avi", "Choose Accessory.avi" and "Set_Language.avi" are exemplary service files. More, fewer or other service files may be used.

In order to facilitate the video content selection methodology described herein the storage device is provided with a user interface in order for the storage device to receive user inputs (i.e., user commands) to perform the video files selections on the storage device rather than on the host of the storage device, which host may be, for example, a DVD player. "User input" refers herein to any data, such as data representing user selection for content, which is received in the form of a command or any other form or format conforming to any usable protocol or standard. Video content may be selected by a user from a selection menu that is played back by a host and displayed by a display device connected to the host. The way the virtual root directory and the storage device's user interface facilitate selection of video files for playback is described below in connection with FIGS. 1 through 7.

Figure 1:
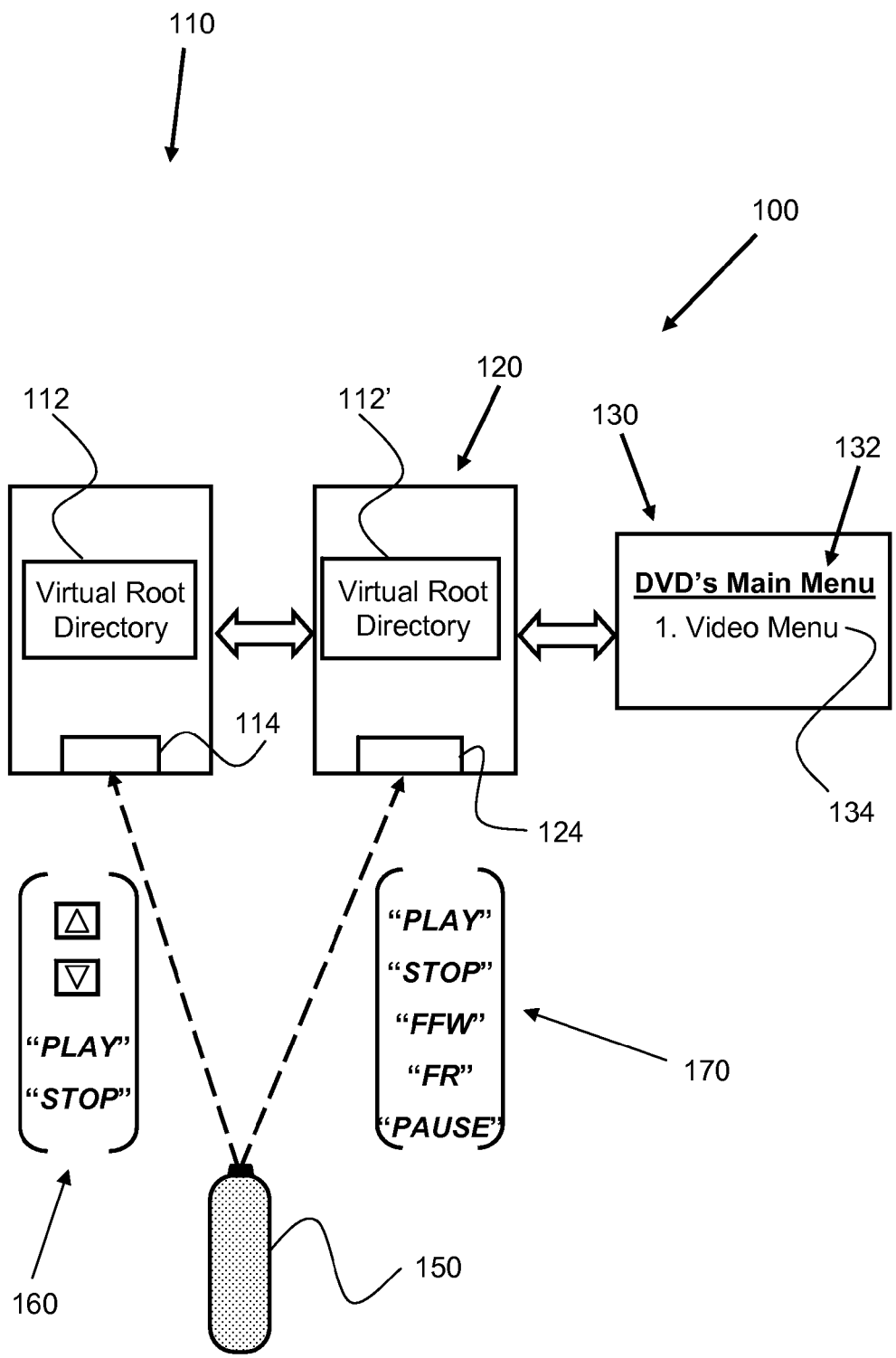
FIG. 1 is a general video system according to an example embodiment.

FIG. 1 is a video playing system 100 according to an example embodiment. Video playing system 100 includes a storage device 110, a content playing host (e.g., a traditional DVD player) 120, a display device 130 (e.g., a television) and a wireless remote control 150. Storage device 110 may be, for example, a UFD device. If DVD player 120 and storage device 110 are operatively connected, DVD player 120 displays menus and related video contents, which are stored on storage device 110, on display device 130.

Storage device 110 is provided with a user interface 114. DVD player 120 is also provided with a user interface 124. Each of user interfaces 114 and 124 may be or include some wireless communication interface, for example, an Infrared Data Association ("IrDA") compatible interface. Briefly, the Infrared Data Association (IrDA) defines physical specifications communication protocol standards for the short-range exchange of data over infrared light. IrDA interfaces are used, for example, in palmtop computers, mobile phones, and laptop computers.

Remote control 150 allows transmitting user inputs (i.e., user commands) to DVD player 120, some of which are applicable during playback of video content and others are not. For example, if no video file is currently played back by a DVD, the DVD player is responsive to a "PLAY" command and if some video file is played back it is responsive to some other remote control commands, for example to "STOP", "PAUSE", and "FAST FORWARD" commands, and irresponsive to other commands, for example to selection commands ("" ▲ "", "" ▼ "", "" ◀ "", "" ▶ ""). "Irresponsive to a particular command" means that the DVD player ignores the particular command (i.e., user input) for being inapplicable while some other command is executed, for example the "PLAY" command. The functional distinction between applicable commands and inapplicable commands allows one remote control (e.g., remote control 150) to operate both storage device 110 and DVD player 120 by transmitting commands applicable to storage device 110 (i.e., through user interface 114) or commands applicable to DVD player 120 (i.e., through user interface 124). By way of demonstration, a partial set of commands applicable to storage device 110 is shown at 160 and a partial set of commands applicable to DVD player 120 is shown at 170. A command may be applicable at one time only to storage device 110 or, at another time, only to DVD player 120; i.e., depending on the current operation status of DVD player 120 or depending on the command which is currently executed by it (e.g., "PLAY", "STANDBY", "PAUSE", etc.).

A user of DVD player 120 controls operations related to the selection of video files by transmitting corresponding commands from remote control 150 to storage device 110. The user may also use remote control 150 to transmit various commands to DVD player 120, to control operations such as stopping or pausing a currently played back video content, fast forwarding ("FFW") video content, etc.

Storage device 110 holds a virtual root directory 112 for presenting to the DVD a content selection file and, as explained above, additional service files. The content selection file contains a content selection menu by which video files can be played back from storage device 110. Storage device 110 transfers virtual root directory 112 to DVD player 120 (the copy of the virtual root directory 112 is shown at 112') to prompt DVD player 120 to traditionally generate and display, on display 130, a main menu that corresponds to virtual root directory 112. By "traditionally generating and displaying a main menu" is meant herein receiving a root directory, by a host (e.g., DVD player 120) from a storage device (e.g., storage device 110), generating a main menu, by the host, from the received root directory and displaying the main menu on a display device, where generating the main menu is done using a proprietary menu generation mechanism of the host. Accordingly, the main menu may be thought of as a "DVD-generated main menu", or as the "DVD's menu". Main menu 132, which is derived from virtual root directory 112, is an exemplary DVD-generated menu. Main menu 132 may be thought of as the DVD's menu, as opposed to other menus that are generated by the storage device, as described below in connection with FIGS. 2 through 7.

By way of example, main menu 132 includes one main menu item called "Video Menu" 134. Video Menu 134 references the content selection file, which means that selection, by a user of system 100, of the main menu item "Video Menu" 134 would result in storage device 110 sending to DVD player 120 a video stream representative of a menu by which video files can be selected by the user for playback. The way storage device 110 handles the content selection file in response to commands received from remote control 150, via user interface 114, is described in detail in connection with FIGS. 2 through 7, which are described below.

Figure 2:
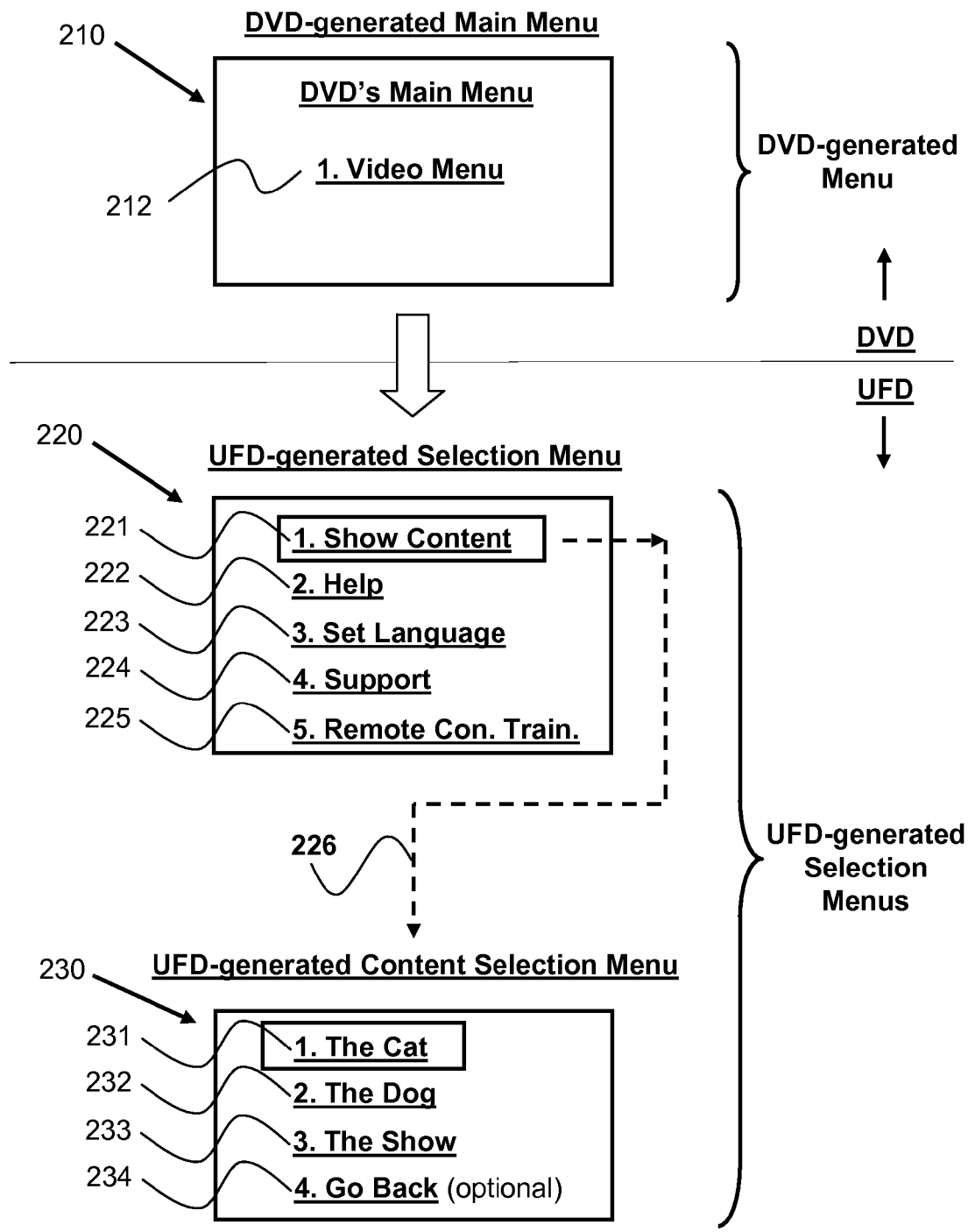
FIG. 2 is a method for selecting files for playback according to an example embodiment.
Figure 3:
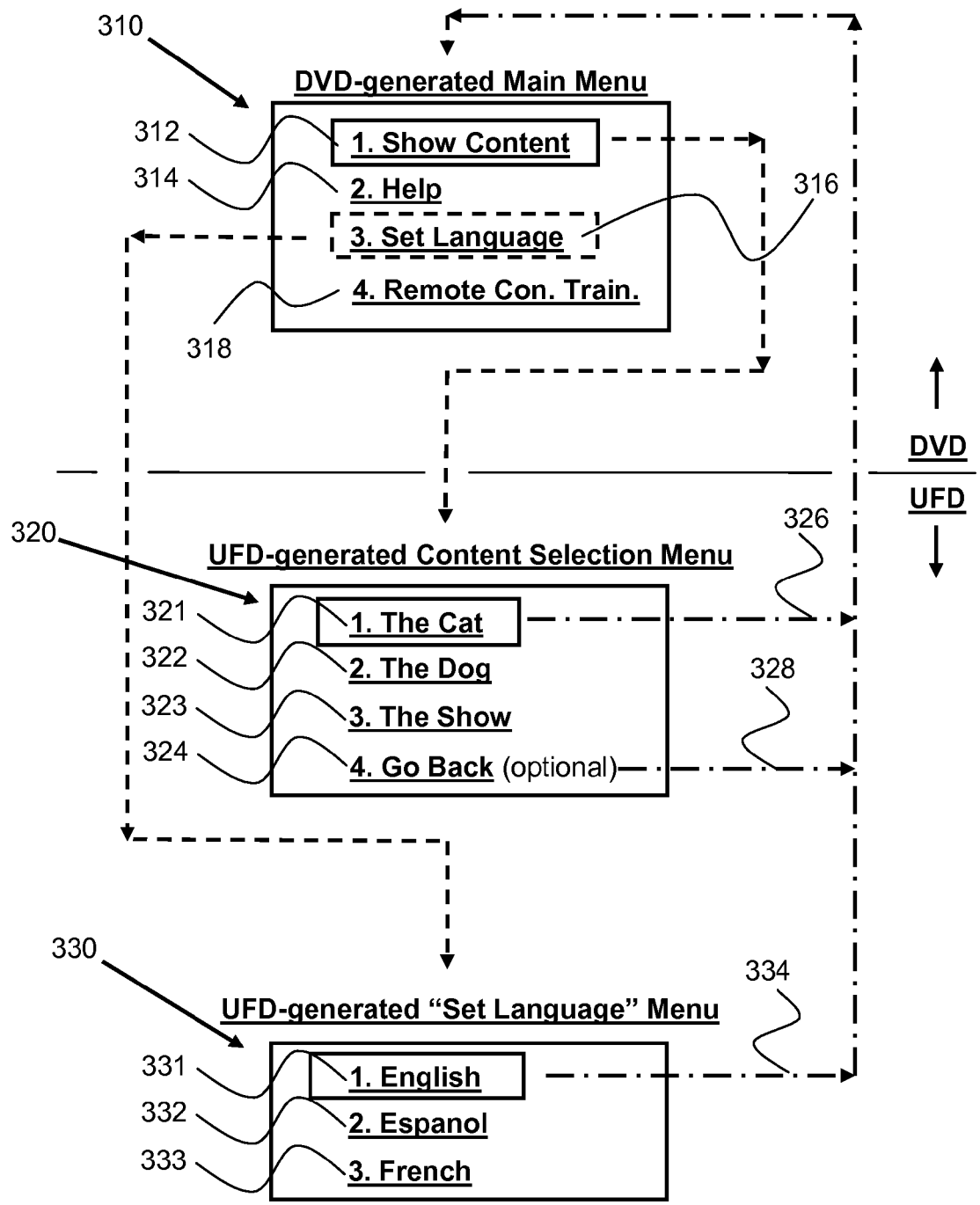
FIG. 3 is a block diagram of a storage device according to an example embodiment.

According to the embodiment shown in FIG. 2, the DVD-generated main menu includes one main menu item which corresponds to a main menu file. When the main menu file is played back storage device 110 generates a video stream representative of a Selection Menu by which the user can play video files, and helpful information (e.g., help and service information). According to an example embodiment which is shown in FIG. 3, the DVD-generated main menu includes more than one main menu item, one of which is associated with a Content Selection File that facilitates playing video files, and other main menu items that allow playing back various service files.

Storage device 110 contains a virtual file system that allows it to access, and generally to internally manage, the various menu-related video frames and video frames that are stored on storage device 110. The virtual file system and the related virtual root directory may be generated by storage device 110, or they may be generated elsewhere, for example by DVD player 120, and provided to storage device 110.

FIG. 2 shows a methodology for playing video contents according to one example embodiment. FIG. 2 will be described in association with FIG. 1. According to this embodiment the virtual root directory (e.g., virtual root directory "c:\, . . . ,") that storage device 110 presents to DVD player 120 includes only a general menu file called "Video_Menu. avi", which can be referenced by the main menu item called "Video Menu" 212.

DVD player 120 uses its proprietary menu generation mechanism to generate and to display a main menu 210 from the virtual root directory "c:\Video Menu. avi". The DVD-generated main menu 210 includes, according to this embodiment, one main menu item (i.e., Video Menu 212) that corresponds to the general menu file "Video Menu.avi". Main menu item Video Menu 212 is playable like a regular video content except that instead of playing back a movie or the like playing back main menu item Video Menu 212 results in displaying a storage device generated menu (i.e., Selection Menu 220). Main menu item Video Menu 212 is playable by the user by transmitting a playback command (typically "PLAY") from remote control 150 to DVD player 120 (i.e., via user interface 124), as s/he would do to play, for example, a movie. As explained above, because no selection has been done yet by the user of DVD player 120, the "PLAY" command transmitted by remote control 150 is applicable to DVD player 120 but ignored by storage device 110.

By way of example, storage device generated Selection Menu 220, which is displayed on display device 130 of system 100 of FIG. 1, includes five exemplary Selection Menu items that are user-selectable items: "Show Content" 221, "Help" 222, "Set Language" 223, "Support" 224, and "Remote Control Training" 225. The file associated with item Help 222 may provide the user with information, for example, regarding how to use the menu generation mechanism of storage device 110.

The video image of the storage device generated Selection Menu 220 is produced by storage device 110 repeatedly transferring the same video frame (i.e., the video frame with the image of Selection Menu 220) to DVD player 120. Unless storage device 110 is instructed otherwise by the user (e.g., by using remote control 150), storage device 110 continuously sends to DVD player 120 the same video frame each time DVD player 120 requests the next video frame of the content of the played back main menu item "Video Menu 212. As far as DVD player 120 is concerned, it "thinks" that it is playing a regular video file, for example a movie or the like.

As explained above, DVD player 120 is "aware" only of video files that are presented to it by virtual root directory 112, and virtual root directory 112 does not present to DVD player 120 video files of movies, video clips, etc. In order for a user to be able to select the movies, video clips, etc. for playback the storage device generated Selection Menu 220 is user-interactive, the interaction therewith is as described below.

The first selectable selection menu item (i.e., selection menu item "Show Content" 221) is shown circumscribed in a rectangular line to symbolically show that it has been selected by the user for playback. A user may use remote control 150 to send a selection command (e.g., a "down" arrow) to storage device 110 to select (i.e., highlight) for playback any other selection menu item of Selection Menu 220 (e.g., "Set Language" 223). In order to play back the currently selected/highlighted item (i.e., selection menu item 221) the user uses remote control 150 to transmit a second "PLAY" command to storage device 110 (the first "PLAY" command is sent to DVD player 120 to play main menu item Main Menu 212). Subsequent "PLAY" commands (i.e., "PLAY" commands following the "PLAY" command sent to DVD player 120) are applicable to storage device 110 but ignored by DVD player 120 while main menu item Video Menu 212 is played back.

Selection menu item Show Content 221 is related to a Content Selection File by which the user can play back video files. Playing back selection menu item Show Content 221 results (shown at 226) in repeatedly displaying a video image (i.e., a video frame) of a Content Selection Menu 230. By way of example, Content Selection Menu 230 includes a list of three exemplary user-selectable content selection menu items that represent, or are associated with three video files (e.g., "The Cat.avi", "The Dog.avi", and "The Show.avi") and a directive item (i.e., "Go Back" 234) that, when "played back", causes storage device 110 to revert to the calling menu which, in this example, is Selection Menu 220. Each video-related item in the list of content selection menu items of Content Selection Menu 230 has an associated video file which is stored in storage device 110. Content selection menu item "Go Back" 234 is optional for the reason explained herein.

Content Selection Menu 230 is also storage device generated because, as long as selection menu item Show Content 221 is "played back" and unless instructed otherwise by the user (e.g., by using remote control 150), storage device 110 continuously sends to DVD player 120 the same image (i.e., video frame) of Content Selection Menu 230 each time DVD player 120 requests the next video frame. Consequently, the video frame of Content Selection Menu 230 is repeatedly displayed by DVD player 120 on display device 130 as the video content of the played back Selection Menu item "Show Content" 221. However, as far as DVD player 120 is concerned, DVD player 120 still plays back the main menu item "Video Menu" 212, as it does not "know" that instead of receiving from storage device 110 video frames for main menu item Video Menu 212 it repeatedly receives from storage device 110 the video frame of Content Selection Menu 230.

While Content Selection Menu 230 is displayed on display device 130 the user may play any video file that is referenced by any of the Content Selection Menu items 231 through 233 (e.g., "The Cat" 231 that references a video file called, for example, "The Cat.avi" or "Cats_in_the_wild.avi") by highlighting it (e.g., by transmitting "up" or" down" commands from remote control 150 to storage device 110) and, then, by transmitting a "PLAY" command from remote control 150 to storage device 110. By way of example, the Content Selection Menu item "The Cat" 231 is shown selected, or highlighted, for playback (i.e., by being circumscribed in a rectangular line). A video file referenced by the Content Selection Menu item "The Cat" 231 (or by other Content Selection Menu items; e.g., Content Selection Menu item "The Dog" 232) may be, for example, an animated movie. In order to playback the Content Selection Menu item "The Dog" 232 the user has to highlight it by using the "down" command once, and then transmit a "PLAY" command to storage device 110 to actually play it.

While storage device generated Selection Menu 220 is played back, storage device 110 forwards to DVD player 120 a first video stream/signal that corresponds to Selection Menu 220. However, responsive to receiving (i.e., via user interface 114) a user command to playback a Selection Menu item of Selection Menu 220 storage device 110 replaces the first video stream with a second video stream/signal that corresponds to the Selection Menu item that is currently played back. For example, if the user issues a command to storage device 110 to play back the Selection Menu item "Show Content" 221, storage device 110 replaces the first video stream associated with storage device generated Selection Menu 220 with a second video stream/signal that corresponds to Content Selection Menu 230. The process, by which one video stream/signal is replaced with another video stream/signal as a result of the user transmitting a playback command to storage device 110, is referred to herein as "concatenation". For example, if a first video stream/signal corresponds to displayed menu "A" and the user plays back a menu item "A2" of menu A, playing back menu item A2 results in replacing the first video stream/signal with a second video stream/signal corresponding to menu item A2, and menu item A2 is regarded as video-wise concatenated into the video stream/signal corresponding to menu A. It may likewise be said that a file referenced by menu item A2 is concatenated to file referenced by menu item A. "Concatenating a video file to a streaming video signal" means that streaming of the video signal to DVD player 120 is stopped and, instead, the video signal streamed to DVD player 120 includes video frames of the video content selected for playback. The video frames of the video file will be displayed on display device 130 instead of the stopped video content. Concatenating video frames of a video content to the streaming video signal can also be thought of as concatenating a video file to the streaming video signal 'on-the-fly'.

Selection Menu items 222, 223, 224 and 225, which are associated with service, informative and training files, are video-wise managed by storage device 110 in the same way as the Selection Menu item "Show Content" 221, with the exception that, instead of displaying menu items that are associated with video files, Selection Menu items 222 through 225, when played back, display service information or remote control's training information in a user-interactive way. For example, responsive to the user transmitting a PLAY command to storage device 110 to play Selection Menu item "Set Language" 223 storage device 110 repeatedly transfers to DVD player 120 an image (i.e., a video frame) that includes a Language menu that offers the user several languages (e.g., English, Espanol and French) from which the user can select a language, for example for interacting with storage device 110. The user can "play" a language in the same way as Selection Menu item "Show Content" 221, except that "playing back" a language (i.e., selecting a language) may result in storage device 110 causing information to be displayed on display device 130 in the selected (i.e., "played back") language, or causing a dictionary file of the selected language to be played back.

After play back of a video file (e.g., the "The Cat.avi" referenced by Content Selection Menu item "The Cat" 231) is completed, or requested information has been provided (e.g., by using item "Support" 224) or a selection has been made (e.g., by using item "Set Language" 224), storage device 110 reverts to the previously displayed (i.e., the "calling" or "parent") menu by resuming transmission of its video stream/signal. For example, after play back of the Content Selection Menu item "The Cat" 231 is completed, storage device 110 reverts to the storage device generated Content Selection Menu 230 by resuming transmission of the video stream/signal corresponding to Content Selection Menu 230. "Playing back" Content Selection Menu item "Go Back" 234 would cause storage device 110 to revert to the storage device generated Selection Menu 220.

It is noted that only Main Menu item Video Menu 212 is displayed to the user by using the DVD player's proprietary menu generation mechanism because only files which are referenced by the virtual root directory are exposed to DVD player 120 and, as explained in connection with this embodiment, the virtual root directory includes (i.e., according to FIG. 2) only one file; i.e., the file referenced by Main Menu item Video Menu 212. In contrast, Selection Menu 220 and Content Selection Menu 230 are displayed to the user by using the proprietary menu mechanism of storage device 110. That is, storage device 110 causes these menus to be displayed on display device 130 by DVD player 120 by playing back pertinent files as regular video files.

As explained herein, storage device 110 may present to DVD player 120 a virtual file system that includes one file associated with main menu item Video Menu 212, or like file and additional one or more service files. Therefore, the video files that are stored on storage device 110 are not exposed to the menu generation mechanism of DVD player 120: these video files can be consumed by the user of system 100 of FIG. 1 only by using a corresponding storage device generated menu.

Video representations of menu items such as Selection Menu items 221 through 225 may be stored in storage device 110 and displayed, video-wised, as separate video components (i.e., as a split menu screen), each video component representing one playable file. Alternatively, the menu items may be stored in storage device 110 and displayed as a whole (i.e., as one video component).

FIG. 3 shows a methodology for playing back video contents according to another example embodiment. FIG. 3 will be described in association with FIG. 1. According to this embodiment the virtual root directory (e.g., "c:\, . . . ,") that storage device 110 presents to DVD player 120 refers DVD player 120 to more than one playable file, one of which (which is called in FIG. 3 "Show Content" 312) allows a user to play back video files (i.e., movies, video clips, etc.), and the other files are service files. None of the video files stored on storage device 110 can be played back directly from the DVD-generated Main Menu 310. In order to play back a video file that is stored on storage device 110 the video content selection file associated with Main Menu item "Show Content" 312 has to be played back first, as described below.

DVD player 120 uses its proprietary menu generation mechanism to generate the DVD's main menu 310 from the virtual root directory "c:\, . . . ,". By way of example, the virtual root directory "c:\, . . . ," includes, or refers DVD player 120 to, four files which are referenced by the main menu item names "Show Content" 312, "Help" 314, "Set Language" 316, and "Remote Control Training" 318. The main menu item names "Show Content", "Help", "Set Language", and "Remote Control Training" infer the use of the pertinent files and, as such, these files can be named differently. In this example, when the file associated with main menu item "Show Content" 312 is played, it allows the user of DVD player 120 to select and play video files; the file associated with the main menu item "Help" provides various helpful information; the file associated with the main menu item "Set Language" allows the user to set a preferred language, for example for the user-storage device interaction; and the file associated with the main menu item "Remote Control Training" 318 allows a user to "teach" a remote control user commands, as described below. Accordingly, DVD-generated main menu 310 includes four menu items, each item corresponding to a different file that storage device 110 presents to DVD player 120 by/via the virtual root directory.

Storage device 110 may be trained by a user to "understand" various remote control commands. In order to train storage device 110 storage device 110 transfers to DVD player 120 a displayable message that, when played back, prompts the DVD's user to press some button on remote control 150 to transmit a signal corresponding to a particular command. For example, the displayable message transferred to the DVD player for display on display device 130 may be "Please press a button of your choice that will be identified as a "PLAY" command!". Upon pressing a button on remote control 150 (e.g., button "PLAY"), storage device 110 detects the signal transmitted to it and associates it to the "PLAY" command. The same procedure may be repeated as many times as required for additional commands and the results of the training phase (i.e., the button-command associations) may be held in a training table stored on storage device 110. After the training phase is completed, the next time the user presses a particular button on remote control 150 storage device 110 will interpret the transmitted signal based on the training results held in the training table.

Each of the main menu items "Show Content" 312, "Help" 314, "Set Language" 316 and "Remote Control Training" 318 is playable like a regular video content except that instead of displaying a video file of a movie, video clip, or the like, playing back any of main menu items 312, 314, 316 and 318 results in displaying a content selection menu or some service or help information associated with the other pertinent playable main menu items, as described below.

In order for the user of DVD player 120 to be able to play a video file, the user has to play back the main menu item "Show Content" 312 first, in a traditional way, by highlighting/selecting the main menu item "Show Content" 312 (the selection being shown by main menu item Show Content 312 being circumscribed in a rectangular line) and, then, by transmitting a "PLAY" command from remote control 150 to DVD player 120 to play it. The user may likewise use remote control 150 to send a selection command to DVD player 120 to select and play any other main menu item of DVD-generated main menu 310, for example main menu item "Help" 314 or main menu item "Set Language"316.

Playing back main menu item Show Content 312 results in repeatedly displaying a video frame of Content Selection Menu 320 on display device 130, which is why Content Selection Menu 320, and, by the same token, Set Language menu 330, Selection Menu 220 and Content Selection Menu 230, are referred to as storage device generated menus. By way of example, Content Selection Menu 320 includes a list of 3 content selection menu items (i.e., content selection menu items 321, 322 and 323) where each of these items has an associated video file stored on storage device 110.

As long as main menu item Show Content 312 is regarded by DVD player 120 as being played back and unless instructed otherwise by the user, storage device 110 continuously sends to DVD player 120 the video frame of Content Selection Menu 320 each time DVD player 120 requests the video content (i.e., the next video frame) of the main menu item "Show Content" 312. As far as DVD player 120 is concerned, DVD player 120 plays back Content Selection Menu 320 as a regular video content. By way of example, Content Selection Menu 320 includes four exemplary Content Selection Menu items that are user-selectable menu items that represent three video contents (i.e., Content Selection Menu item "The Cat" 321, Content Selection Menu item "The Dog" 322, and Content Selection Menu item "The Show" 323) and one directive item (i.e., Content Selection Menu item "Go Back" 324) that, when "played back", causes storage device 110 to revert to the previous menu frame which, in this example, is DVD-generated main menu 310.

While Content Selection Menu 320 is displayed the user may select and play any Content Selection Menu item (e.g., "The Cat" 321) by highlighting it (by transmitting a corresponding selection command from remote control 150 to storage device 110) and, then, by transmitting a "PLAY" command to storage device 110 via user interface 114. By way of example, the Content Selection Menu item "The Cat" 321 is shown selected, or highlighted for playback (i.e., by being circumscribed in a rectangular line). In order to play back Content Selection Menu item "The Dog" 322 the user has to highlight it by using the "down" command once, and, then, to transmit a "PLAY" command to storage device 110 to actually play it. Like storage device generated Selection Menu 220 and Content Selection Menu 230 of FIG. 2, Content Selection Menu 320 is also user-interactive to facilitate user selections. User selections are facilitated by user-interactive menus because storage device 110 "knows" which menu file is currently played back. Therefore, being able to correctly interpret user inputs (i.e., commands), storage device 110 can comply with user selections.

After the user transmits the "PLAY" command to DVD player 120 to play main menu item Show Content 312, subsequent "PLAY" commands are applicable to storage device 110 but ignored by DVD player 120 while the main menu item Show Content 312 is regarded by DVD player 120 as being played back.

While Content Selection Menu 320 is played back storage device 110 forwards to DVD player 120 a first video stream/signal that corresponds to it. However, responsive to receiving a user command to play back a Content Selection menu item of Content Selection Menu 320 storage device 110 replaces the first video stream/signal with a second video stream/signal that corresponds to the menu item that is being played back. For example, if the user issues a command to storage device 110 to play back Content Selection Menu item "The Cat" 321, storage device 110 replaces the first video stream/signal associated with Content Selection Menu 320 with a second video stream/signal that corresponds to Content Selection Menu item "The Cat" 321. Regarding the replacement of the first video stream/signal with the second video stream/signal, the video content associated with Content Selection Menu item "The Cat" 321 may be thought of as being video-wise concatenated into the video content associated with Content Selection Menu 320. As far as DVD player 120 is concerned, main menu item Show Content 312 is played back even though a video content associated with a Content Selection Menu item (e.g., Content Selection Menu item "The Cat" 321) is being played back.

Main menu items 314, 316 and 318, which are associated with service and informative files, are video-wise managed by storage device 110 in the same way as main menu item "Show Content" 312. However, instead of displaying menu items of video contents, main menu items 314, 316 and 318 display service information in a user-interactive way. For example, responsive to the user transmitting a playback command to storage device 110 to play back main menu item "Set Language" 316 storage device 110 repeatedly transfers to DVD player 120 a video frame of a "Set Language" menu 330 that contains several languages, in this example "English" 331, "Espanol" 332, and "French" 333, from which the user can play back (i.e., select) a language. "Playing back" a language may result in storage device 110 causing information to be displayed on display device 130 in the preferred (i.e., in the selected) language, or referencing a bi-lingual dictionary. The user can select a language by highlighting it and, then, playing it in the same way as Content Selection Menu item "The Cat" 321, for example.

After playback of Content Selection Menu item "The Cat" 321 is completed, or a requested information has been provided (e.g., by playing main menu item "Help" 314), or a selection has been made (e.g., by using main menu item "Set Language" 316), storage device 110 may automatically revert to the previously displayed menu or to the "parent menu", or reversion to the previously displayed menu may be initiated by the user. By "parent menu" is meant the menu that includes the menu item subject to the reversion. For example, content selection menu 320 is the parent menu of each of content selection menu items 321 through 324.

Reverting to the parent menu or to the previously displayed menu is done by resuming transmission of the video stream/signal corresponding to the parent menu or to the previously displayed menu. For example, after playback of the Content Selection Menu item "The Cat" 322 is completed, storage device 110 automatically reverts to Content Selection Menu 320 (i.e., the parent menu of the Content Selection Menu item "The Cat" 322) by resending to DVD player 120 the video stream/signal associated with or representative of Content Selection Menu 320. Storage device 110 may, instead, automatically revert (shown at 326) to the previously displayed menu (i.e., to Main Menu 310) by resending to DVD player 120 the video stream/signal associated with or representative of Main Menu 310. Reverting to Content Selection Menu 320 allows the user to play back another Content Selection Menu item (e.g., the Content Selection Menu item "The Dog" 322). Reverting to Main Menu 310 allows the user to play back another Main Menu item (e.g., the Main Menu item "Help" 314). Storage device 110 may revert to Content Selection Menu 320 or to Main Menu 310 (depending on the use case) upon, immediately or shortly after playback of a Content Selection Menu item is completed. Alternatively, after playback of a Content Selection Menu item (e.g., "The Show" 323) is completed, storage device 110 automatically reverts to Content Selection Menu 320 and the user may initiate reversion from Content Selection Menu 320 to Main Menu 310 by "playing" Content Selection Menu item "Go Back" 324 (reverting to Main Menu 310 by playing menu item "Go Back" 324 is shown at 328).

In response to "playing" (i.e., selecting) Set Language Menu item "English" 331 storage device 110 may automatically revert to Main Menu 310 to allow the user to play back another main menu item (e.g., main menu "Remote Control Training" 318). Automatic reversion from Set Language Menu 330 to Main Menu 310 is shown at 334. Storage device 110 may revert to Main Menu 310 upon, immediately or shortly after a language is "played".

While a content selection menu item of Content Selection Menu 320 (e.g., "The Show" 323) is played back, a "Scene Advance" feature may be used by the user to jump forward to a next video segment or backward to a previous video segment, as described below. Some conventional remote controllers include "next scene" and "previous scene" buttons that can be used with MPEG-2 formatted content. However, because the video content of storage device 110 is not MPEG-2 formatted, no scene definition is used by DVD player 120, which means that "next scene" and "previous scene" commands are ignored by DVD player 120. Therefore, storage device 110 can be configured to use this type of commands (i.e., scene jump commands) without interfering DVD player 120 and without being interfered with by DVD player 120.

By using "next scene" and "previous scene" commands the user may scene-wise jump by a certain unit that can be, for example, 10-minute units or 10% steps of the overall video content. If the 'jump unit' is time-based, video scenes of the video content may have to be time stamped by storage device 110 or by DVD player 120 prior to playing them back. If the 'jump unit' is some user-changeable percentage of the bit-wise length of the played back video file, storage device 110 may use a "scene counter" to translate a specific jump command (e.g., "jump forward 25% of the video content") into a corresponding location in a memory of storage device 110 from which storage device 110 should continue playing back the involved video content. Jump commands may be transmitted from remote control 150 to storage device 110 while video files are played back.

Selection menu item "Show Content" 221 of FIG. 2 and main menu item "Show Content" 312 of FIG. 3 are similar in one aspect and different in another. That is, they are similar in the sense that, while they are played back, they allow users of DVD player 120 to play video files, and they are different in the sense that, being part of the Selection Menu 220, selection menu item "Show Content" 221 is displayed on display device 130 by using a video stream/signal that storage device 110 transfers to DVD player 120, whereas main menu item "Show Content" 312, like main menu items 314, 316 and 318, is traditionally displayed on display device 130 as part of a DVD menu that is traditionally generated by the DVD player's proprietary menu generation mechanism.

Figure 4:
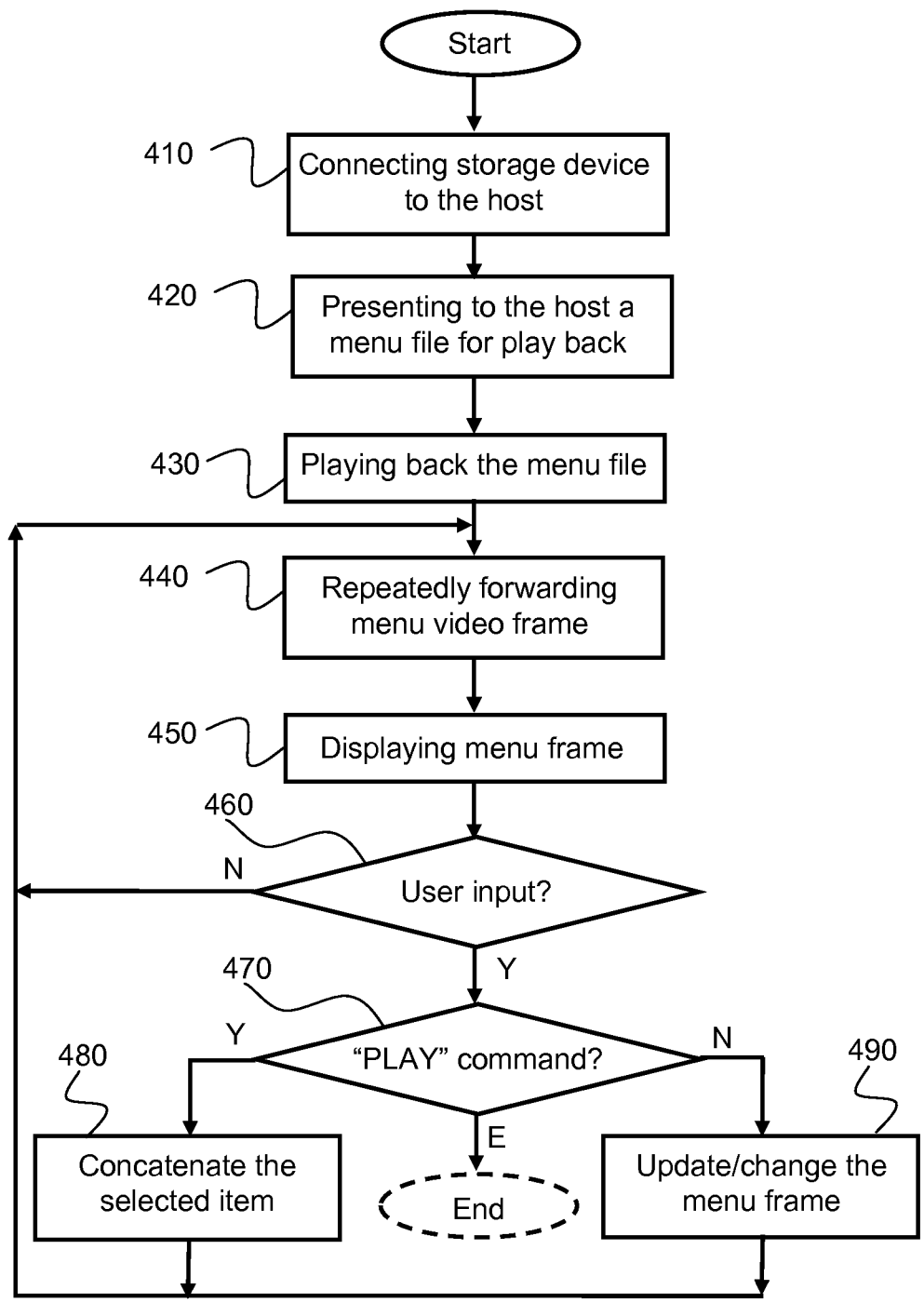
FIG. 4 is a process by which the storage device of FIG. 3 operates with a host.

FIG. 4 is a method for selecting video contents for playback according to an example embodiment. FIG. 4 will be described in association with FIGS. 1, 2 and 3. In addition, various steps and conditions associated with the operation of the video playing system 100 of FIG. 1 will be described.

At step 410, storage device 110, which contains video files of video contents, one or more service files and a playable Content Selection file, is operatively connected to DVD player 120. A file system, which is stored on storage device 110, includes these files and one or more directory files that contain information pertaining to a normal directory tree by which the video files can internally be accessed by storage device 110 for consumption (i.e., for playback) by DVD player 120. Upon connecting storage device 110 to DVD player 120, DVD player 120 requests from storage device 110 a root directory in order for it to be able to request video content from storage device 110 of playable files that the user of DVD player 120 may want DVD player 120 to play.

At step 420, in response to the DVD player's request for the storage device's root directory, storage device 110 provides DVD player 120 with a copy of virtual root directory 112 that, depending on the implementation, contains, or refers the DVD player only to one file similar to the file associated with the main menu item "Video Menu" 212 of FIG. 2, or to more than one file, as described in connection with FIG. 3 (see Main Menu 310 in FIG. 3). However, for brevity, the method shown in FIG. 4 refers only to the Content Selection File/Menu mentioned above: it does not refer to service files. In other words, it is assumed that storage device 110 presents to DVD player 120 a virtual root directory that includes or refers the DVD player only to one playable file which is associated with the main menu item "Video Menu" 212. Storage device 110 sends (i.e., receives a host requests and returns) to the host a copy of the virtual root directory 112 in order for it to be used by the host to generate and display Main Menu 210.

As explained above in connection with commands that can be applicable either to storage device 110 or to DVD player 120, if no file is currently played back, a "PLAY" command, if transmitted at this stage, is applicable only to DVD player 120. Therefore, being the only option (i.e., there is only one main menu item in FIG. 2: main menu item Video Menu 212), at step 430 the user uses remote control 150 to send/transmit a first user input to DVD player 120 to play back main menu item Video Menu 212. Responsive to receiving the first user input DVD player 120 plays back the main menu item Video Menu 212 by requesting the content of Video Menu 212 from storage device 110 and displaying the requested content on display device 130. Playing back main menu item "Video Menu" 212 involves streaming video content from storage device 110 to DVD device 120 as if the played back file associated with Video Menu 212 were a regular video content/file.

Playing back a video content/file generally includes sending from storage device 110 to DVD player 120 one video frame after another, in response to read commands received from DVD player 120, and displaying the video frames on a display device such as display device 130. As known in the art, storage devices transfer video frames to DVD players in response to "read" commands (which are also called "requests") that the DVD players send to the storage devices. That is, DVD player 120 sends to storage device 110 a series of read commands to which storage device 110 responds by sending a corresponding series of video frames, one frame after another. If the frame's content changes from one video frame to another that would create an illusion of motion. Otherwise, the displayed video content would appear static. A selection menu is basically static in nature: it contains some fixed content and remains unchanged until the user selects a menu item.

Responsive to the user traditionally playing back main menu item "Video Menu" 212, DVD player 120 sends a series of read commands to storage device 110. Storage device 110 responds to the series of read commands by repeatedly sending to DVD player 120, at step 440, the same video frame of Selection Menu 220. At step 450 DVD player 120 displays the video frame it repeatedly receives from storage device 110, which results in Selection Menu 220 being displayed on display device 130 as a still picture.

Storage device 110 may highlight (i.e., mark for selection) some selection menu item (e.g., selection menu item "Show Content" 221) as a default selection and the user may use remote control 150 to play the default selection menu item, or to select and play a different selection menu item (e.g., selection menu item "Help" 222) by navigating or scrolling through Selection Menu 220, for example, by using a direction arrow 160. In order to play back a video file, the user has to play selection menu item "Show Content" 221. Assuming the user plays back selection menu item "Show Content" 221, Content Selection Menu 230 is displayed on display device 130.

At step 460, assuming that Content Selection Menu 230 is currently played back, storage device 110 repeatedly transfers the same video frame of Content Selection Menu 230 to DVD player 120. If storage device 110 does not receive any user input (shown as "No" at step 460), storage device 110 continues to send the same video frame to DVD player 120 in response to each additional read command it receives from DVD player 120, as described above. However, if storage device 110 receives a user input (shown as "Yes" at step 460), storage device 110 checks, at step 470, whether the user input is a command to play back a highlighted menu item or a selection command to navigate through items of Content Selection Menu 230.

As explained above, whether a remote control command (e.g., "PLAY", "STOP", "PAUSE") is applicable, at a given time, only to DVD player 120 or only to storage device 110 depends on the operating status of DVD player 120. After storage device 110 is connected to DVD player 120 the first "PLAY" command (i.e., the first user input) is applicable to DVD player 120 in order for it to play back main menu item Video Menu 212 in a traditional way, whereas subsequent "PLAY" commands (i.e., second user input, third user input, etc.) are applicable to storage device 110.

Therefore, because DVD player already plays a file (i.e., it plays the file of main menu item Video Menu 212) and the first Content Selection Menu item "The Cat" 232 is highlighted as a default item, if the user inputs a "PLAY" command (shown as "Yes" at step 470), the "PLAY" command is applicable only to storage device 110 and storage device 110 responds to the "PLAY" command, at step 480, by concatenating video frames to the streaming video signal, that are related to the played back video file. For example, if the content selection menu item "The cat" 231 is highlighted, a "PLAY" command transmitted from remote control 150 to storage device 110 would cause storage device 110 to concatenate video frames of the video file "The Cat.avi" ("The Cat.avi" is an exemplary file name) to the streaming video signal.

After transfer of all the video frames related to the content selection menu item "The cat" 231 is completed, storage device 110 resumes, at step 440, repeated transfer of the video frame of Content Selection Menu 230 to DVD player 120. DVD player 120, then, redisplays content selection menu 230 on display device 130, at step 450, and, at step 460, storage device 110 waits for another user input.

Referring again to step 470, if the user input transmitted to storage device 110 is not a "PLAY" command (shown as "No" at step 470), storage device 110 checks whether it is a command to select another video file for playback. If the user input is a command for storage device 110 to select another video file for playback, then, at step 490 storage device 110 updates the displayed menu frame in order to prompt DVD player 120 to display the previously selected item as a "deselected" item and the currently selected item as a "selected" item. Then, storage device 110 repeatedly sends the updated video frame to DVD player 120 in order for DVD player 120 to display the updated menu frame on display device 130. Instead of updating the video frame that contains Content Selection Menu 230, storage device 110 may send to DVD player 120 a video frame in which the other selected menu item would be highlighted on display device 130. If the user input is not a command to play or to select a menu item, storage device 110 ignores the command. Normally, the process described in FIG. 4 is terminated when UFD device 110 is removed from DVD player 120 or DVD player 120 is turned off (termination of the process is shown as "E" at step 470.

Figure 5:
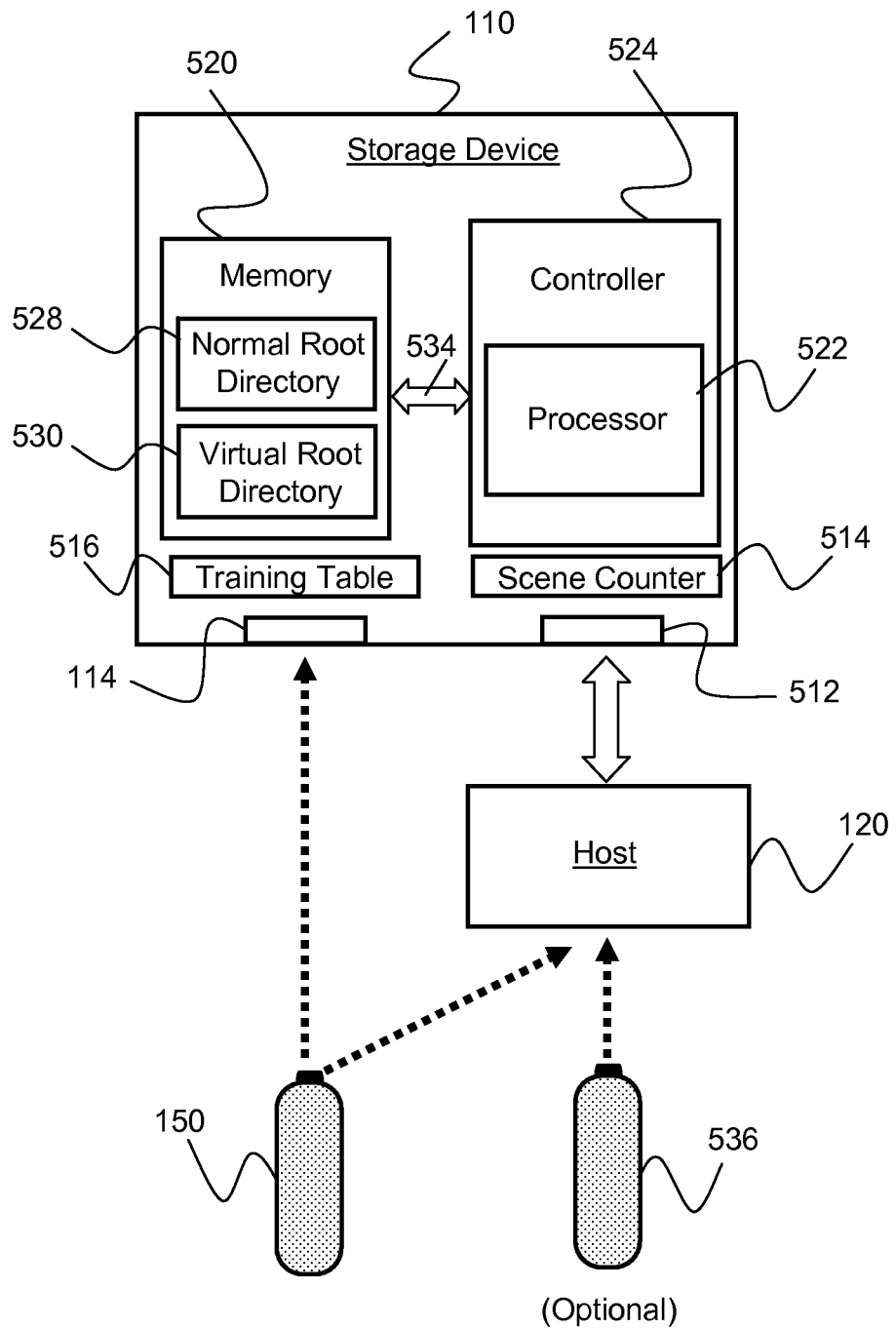
FIG. 5 demonstrates changes in a video stream as it is displayed over time according to an example embodiment.

FIG. 5 is a block diagram of storage device 110 of FIG. 1. Host 120 may be any device, including a display device, which is capable of receiving and playing video content from storage device 110. Non-limiting examples of host 120 include a DVD player, a Personal Computer (PC) supporting video content playback, a networked streaming device capable of providing video content which is received from a network (e.g., a Digital Media Adapter ("DMA")), etc.

Storage device 110 includes a host interface 512 for interfacing with host 120, user interface 114 for receiving signals from remote control 150 associated with user inputs/commands, a controller 524, and a memory 520. User interface 114 may be or include, for example, an infrared ("IR") sensor for receiving IR signals from a remote control such as remote control 150. User interface 114 may alternatively be or include a Bluetooth interface or a voice interface capable of recognizing voice commands.

Controller 524 can be a standard off-the-shelf System-on-Chip ("SoC") device or a System-in-Package ("SiP") device with specialized firmware that, when executed, performs the steps and operations described herein. Alternatively, controller 524 can be an Application-Specific Integrated Circuit ("ASIC") that implements the steps and operations described herein by using hardware.

Memory 520 may hold video files, menu files, service files, directory files, other types of files. Memory 520 may also hold a normal root directory 528 that references some or all of these files. If storage device 110 presents normal root directory 528 to DVD player 120, the main menu generated and displayed by DVD player 120 from that root directory would typically contain every playable file, including video files, that would be selectable in the traditional way; i.e., by sending selection and playback commands only to DVD player 120. The video files stored on memory 520 may be received from host 120 (through host interface 512) or from another data source.

Memory 520 may also hold a second root directory 530, which is called herein a "virtual root directory", that includes menu files that, when played back, facilitate accessing and playing back video files and service files in the way described above. Menu files may include, for example, a Selection Menu file (e.g., "Selection_Menu.avi") of or associated with Selection Menu 220 of FIG. 2 (for example), a Content Selection Menu file (e.g., "Content_Selection_Menu.avi") of or associated with Content Selection Menu 230 of FIG. 2 (for example), and other similar menu files. Virtual root directory may be generated by controller 524, or it may be generated elsewhere, by an external device, and downloaded to memory 520 or to another (i.e., second) memory via host interface 512. The second memory may reside in storage device 110, or it may be external to storage device 110. One or more menu files may be stored in the first memory (i.e., in memory 520) or in the second memory (the second memory is not shown in FIG. 5).

In this example, storage device 110 communicates with host 120 via host interface 512, where the communication with a host includes receiving data requests from the host and responding to the data requests by transferring to the host corresponding video streams. Storage device 110 is operable to provide the requested video contents/files to host 120 by detecting and identifying data and control signals originating from host 120 or from remote control 150. Storage device 110 may receive control signals associated with user inputs and with read commands from the DVD player in response to the user directly operating storage device 110, host 120, or both. For example, a user may use remote control 150 to power up host 120 which may be, for example, a DVD player. Such powering up of host 120 invokes a command sequence that creates a host request to receive a root directory of storage device 110. As explained above, for each operating status of the DVD player some user commands may be applicable only to the storage device or only to the DVD player. If host 120 is in a "turned off" state, a "turn on" command is applicable to host 120 and ignored by storage device 110.

Remote control 150, which may be a universal remote control, may be configured to use a set of predetermined codes to transmit user commands in order to control the operation of storage device 110 and host 120. The user may use one remote control (e.g., remote control 150) to operate both storage device 110 and host 120 or, alternatively, the user may use two remote controls: one (i.e., remote control 150) for controlling operation of storage device 110 and another (i.e., remote control 536) for controlling operation of host 120. If separate remote controls are used to operate storage device 110 and host 120, each system (i.e., storage device 110 and its remote control, and host 120 and its remote control) may use a different communication protocol, communication standard, or communication technology. For example, storage device 110 and remote control 150 may use optical communications (e.g., IrDA), and host 120 and remote control 536 may use radio wave signals (e.g., Bluetooth).

Controller 524 controls data transfers to and from memory 520 via data and control lines 534. Controller 524 also controls data transfers to and from host 120 via host interface 512. Controller 524 controls the data transfers to/from memory 520 and data transfers to/from host 120 by controlling operations such as "read", "write" and "erase" operations, wear leveling, and so on, and by controlling communication with host 120. Host 120 does not have direct access to memory 520. That is, in order for host 120 to receive data or video content from storage device 110, host 120 has to request it from controller 524. If host 120 is, for example, a DVD player, it plays back video files by sending a corresponding series of requests for data to controller 524, and controller 524 complies with each such request by transferring a corresponding video frame.

Controller 524 includes a processor 522. Processor 522 may be embedded within controller 524 or external to it. Processor 522 is configured to provide video content to host 120 in response to host requests which storage device 110 receives from host 120 through host interface 512. Processor 522 may also provide the video content to host 120 responsive to a user input that it receives from remote control 150 via user interface 114. Unless said otherwise, operations and functions attributed to storage device 110 are to be construed as being performed by controller 524 or by processor 522.

Controller 524 can be a standard off-the-shelf System-on-Chip ("SoC") device or a System-in-Package (SiP") device with specialized firmware that, when executed, performs the steps and operations described herein. Alternatively, controller 524 can be an Application-Specific Integrated Circuit ("ASIC") that implements the steps and operations described herein by using hardware.

Figure 6:
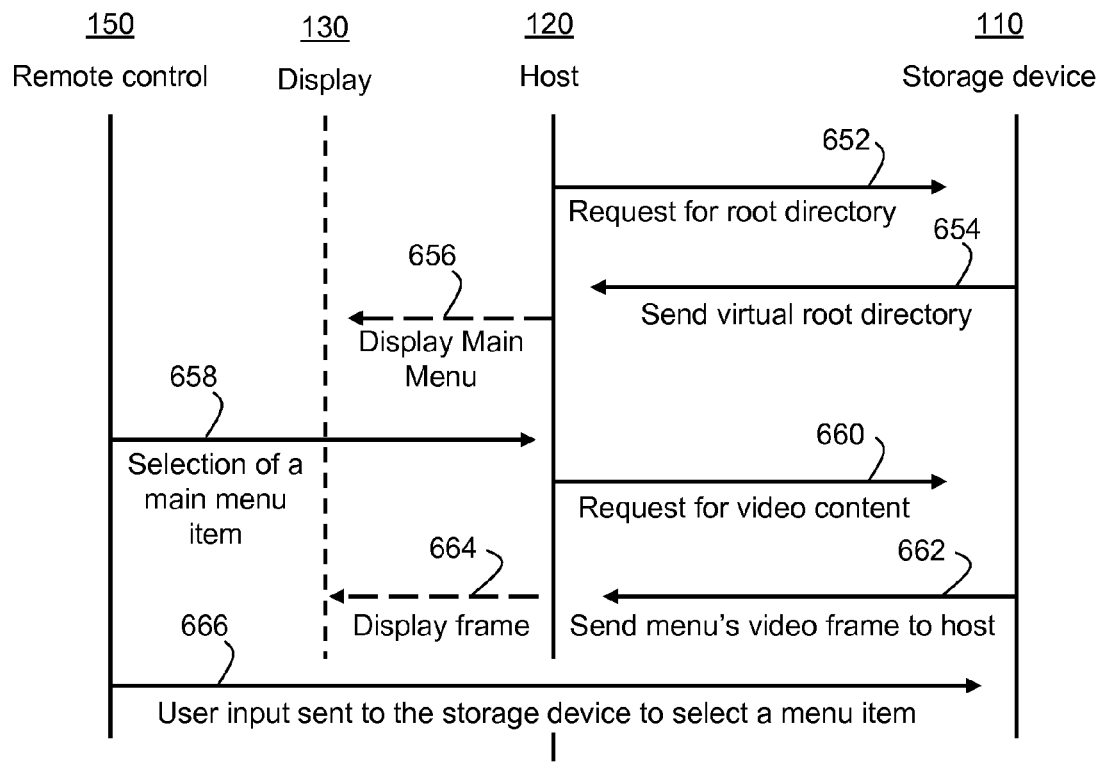
FIG. 6 shows messages exchanged between a storage device and DVD player according to an example embodiment.

FIG. 6 shows messages exchanged between storage device 110 and DVD player 120 of FIG. 5. FIG. 6 will be described in association with FIG. 5. When storage device 110 is operationally connected to host 120, host 120 sends a request to storage device 110 to receive a root directory in order for host 120 to generate and display a DVD's main menu. The host's request communicated to storage device 110 is shown at 652 ("Request for root directory"). Storage device 110 responds to the host request for the root directory by communicating to host 120 a copy of a virtual root directory that, depending on the use case, references only a menu file (as shown in main menu 210 of FIG. 2), or a menu file and one or more service files (as shown in main menu 310 of FIG. 3). The storage device's response is shown at 654 ("Send virtual root directory").

Host 120 then uses its proprietary menu mechanism to display a corresponding Main Menu from the virtual root directory. The DVD-generated Main Menu may be similar to DVD-generated Main Menu 210 of FIG. 2 or to DVD-generated Main Menu 210 of FIG. 3. Host 120 generates and forwards a corresponding signal to display device 130 in order to display the DVD-generated Main Menu, as shown at 656 ("Display Main Menu"). The DVD-generated Main Menu may include or have only one main menu item to play (as per the embodiment of FIG. 2), or more then one main menu item to play (as per the embodiment of FIG. 3). Regardless of which embodiment is used, the user uses remote control 150 to select and play back the one main menu item (as per FIG. 2) or any of the main menu items (as per FIG. 3) of the DVD-generated Main Menu for playback, the selection being shown at 658 ("Selection of a main menu item"). The main menu item selected from the DVD-generated Main Menu may be, for example, a "Video Menu" similar to Video Menu 212 of FIG. 2, or some other items similar, for example, to "Show Content" 312, "Help" 314, and "Set language" 316 of FIG. 3 etc.

Responsive to receiving the selection from remote control 150, host 120 sends requests (i.e., read commands) to storage device 110 to receive from it video frames that pertain to the selected item (e.g., video menu 212 of FIG. 2, or show content 312 of FIG. 3). The host's request sent to storage device 110 is shown at 660 ("Request for video content"). Responsive to receiving the host's request for video frames storage device 110 repeatedly transfers to host 120 a menu's video frame of Selection Menu 220 (as per FIG. 2) or of Content Selection Menu 320 (as per FIG. 3). Transfer of the video frame is shown at 662 ("Send menu's video frame to host"). Unless the user makes another selection, storage device 110 continues to repeatedly transfer the same video frame to host 120. Host 120, then, sends an electrical signal to display device 130 to display the menu's video frame. The transferring the electrical signal to display device 130 is shown at 664 ("Display frame"). Once Selection Menu 220 of FIG. 2 or Content Selection Menu 320 of FIG. 3 is displayed on display device 130, selections are made by the user sending selection commands (i.e., user inputs) to storage device 110 rather than to host 120. The user input sent from remote control 150 to storage device 110 is shown at 666 ("User input sent to storage device to select a menu item").

Storage device 110 translates, or maps, each menu item that is displayable on display device 130 to a corresponding video file/content that is referenced by first (i.e., the normal) root directory 528. It may likewise be said that storage device 110 uses each menu item as a pointer or link to a video content/file that is internally retrievable by storage device 110 via first (i.e., the normal) root directory 528.

The virtual directory tree, which, as stated above, references only files that are presented to host 120, may be generated by storage device 110, typically in response to host 120 requesting the storage device's root directory, but also in response to requesting video content. Virtual directory tree may optionally be pre-stored on storage device 110 and then provided to host 120.

By using a virtual root directory to present to a DVD player only a content selection file (and, depending on the implementation, also service files), storage device generated menu-items (of, e.g., Selection Menu 220 and Content Selection Menu 230 of FIG. 2) can be graphically customized. For example, they can be animated or displayed using preferred icons, or video files can be given easy-to-remember or humorous names, etc. In addition, using the virtual root directory facilitates associating between a storage device generated menu item(s) and a password, which means that a user would not be able to play back a particular video file if s/he does not know the password associated with it. In other words, customizing storage device generated menu items may include using an authentication code for controlling access to, and/or display of, some or all the video files that are stored on storage device 110. The user may be prompted by storage device 110 to enter a password by using a menu that is initially displayed on the host, or on a display device connected to the host. As such, storage device 110 provides video content contingent on an authentication code that is received from remote control 150. Multiple passwords could optionally be used by multiple users to protect different video files, or for creating multiple virtual root directories, each referring to, or associated with, files relevant to a different user.

As explained above, if the Content Selection File associated with Content Selection Menu 230 is played back, storage device 110 receives read commands from host 120 to retrieve video frames associated with the Content Selection File, but if a particular video file (e.g., the video file pertaining to the content selection menu item "The Show" 233) is selected through storage device 110 and played back, storage device 110 provides to host 120 video frames associated with the video file that is played back. The ability of storage device 110 to provide video frames other than the ones requested by host 120 (i.e., providing video frames of the video file instead of the video frames of the content selection file) can be used to enhance content management by storage device 110 by processing the requested content before it is forwarded to host 120 as a streaming video content. As such, streaming video content that is presented to host 120 may be modified or altered internally, by storage device 110, in a manner that is transparent to host 120. Such content management feature may include, for example, modifying (e.g., truncating or eliding) the file name of the video files, altering the file type of the data file, highlighting a menu item, etc. File names of the video files stored in storage device 110 can likewise be modified because, as explained above, they are displayed as a text in a video image/frame that can be pre-defined, manipulated and/or modified as desired, and storage device 110 would use each pre-defined, manipulated or modified file name as a pointer to the corresponding video content/file. The video files and the service files are accessible through the normal root directory by using the files' original names.

According to other non-limiting examples, video content management may include grouping together files under a particular common directory. For example, music-type files may be grouped under a common music directory and picture-type files may be grouped under a common picture directory, etc., thereby enhancing the way menus and menu items are displayed. Likewise, different files may be displayed using different backgrounds and images, and icons and/or text may likewise be incorporated into a displayed selection menu. In addition, storage device 110, in conjunction with remote control 150, may facilitate jumping to a subsequent or to a previous video segment by a certain unit (e.g., time or number of frames), etc., as described above. In addition, storage device 110 may shuffle and/or continuously play photos and video clips; enable user-selection and presentation of video content from different camera angles; sort files in a convenient way; remove leading text of long filenames; "split" scenes; display a scene menu with thumbnails, etc.

Certain requests for content that can be anticipated by storage device 110 and proper responses can be created internally, by storage device 110, prior to receiving the host requests. In other words, some responses can be pre-stored in storage device 110 based on anticipated host requests. For example, it is known that a request for a root directory is always issued by a DVD player after a USB flash drive (an exemplary storage device) is connected to the DVD player, and a request to present "Help" content is always known to be issued when a user clicks on a "Help" menu item. Therefore, a pre-defined response containing the virtual directory, the "Help" manual, etc., may be pre-generated and pre-stored on storage device 110 and provided to the DVD player in response to a corresponding request.

Storage device 110 may also provide video content that depends on the type of the host. For example, connecting storage device 110 to a Compact Disk ("CD") or MP3 player may prompt storage device 110 to provide only music files; connecting storage device 110 to a DVD player may prompt storage device 110 to provide to the DVD player video and music files but not text files, etc. Providing files per host type may be facilitated by transferring "type" information from host 120 to storage device 110 that indicates the host's type, capabilities, etc., and by the storage device returning to the host a root directory that references only to files that match the specific type of the host. In order to be able to provide files per host type, storage device 110 may hold, or it may be capable of producing, more then one virtual root directory, each virtual root directory being associated with files relevant to a specific host's type. For example, a first virtual root directory may be associated with files relevant to a DVD player; a second virtual root directory may be associated with files relevant to an MP3 player, etc. In response to receiving the host's "type" information, storage device 110 may transfer to the host a corresponding main menu file after it presents to the host a corresponding virtual root directory. Alternatively, the user may be prompted by storage device 110 to select the host's type, for example, in a displayed host-type menu that contains a list of host types, and, then, to use the remote control to "play back" the selected host type. By "playing back a selected host type" is meant presenting to the host a virtual root directory that corresponds to the type of the host.

Figure 7:
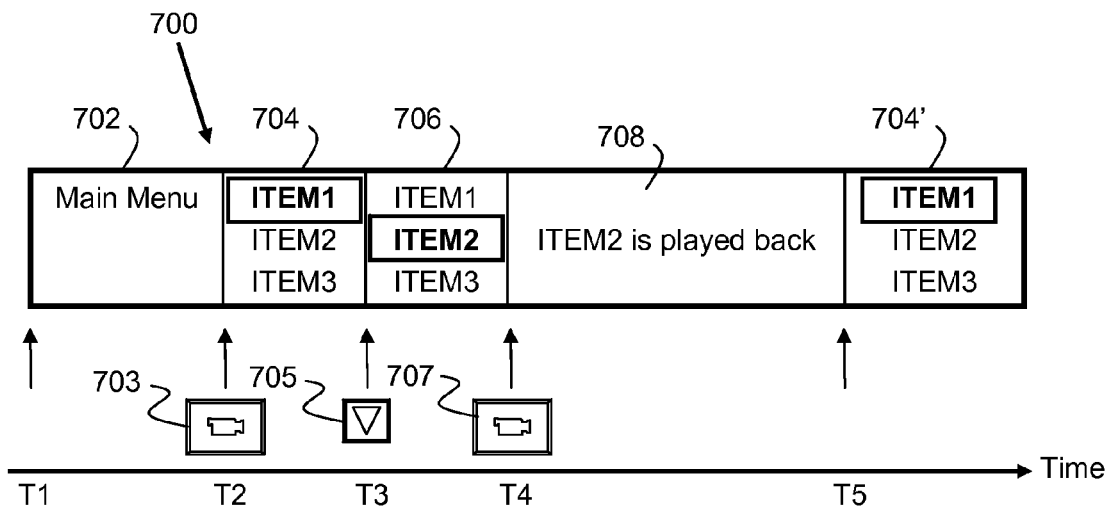
FIG. 7 demonstrates changes in a video stream per user input over time according to an example embodiment.

FIG. 7 demonstrates changes in a video stream as it is displayed over time according to an example embodiment. FIG. 7 will be described in association with FIG. 1. Video stream 700 is displayed on display device 130 that may be, for example, a Liquid Crystal Display ("LCD") screen, a plasma screen, and the like.

At time T1, concurrently to connecting storage device 110 to host 120 host 120 requests a root directory from storage device 110. Storage device 110 transfers to host 120 a virtual root directory that prompts host 120 to generate and display on display device 130 a Main Menu 702). Host 120 traditionally generates and displays Main Menu 702 on display device 130 by using its traditional proprietary menu generation mechanism.

At time T2 the user of host 120 uses remote control 150 (or remote control 536 of FIG. 5) to send a first user input (i.e., a first "PLAY" command) to host 120 in order to play back a video file associated with Main Menu 702. The first PLAY command sent to host 120 is symbolically shown in FIG. 7 as icon 703. It is assumed that when Main Menu 702 is played back, storage device 110 repeatedly transfers a first video stream of or associated with video frame 704 that, in this example, includes a list of three menu items: "ITEM1", "ITEM2", and "ITEM3". It is also assumed that menu item "ITEM1" is selected as a default option, for which reason it is shown highlighted (selected), and that the user wants to play back ITEM 2. At time T3, therefore, the user of host 120 uses remote control 150 to send a "DOWN" (" "▼" ") command to storage device 110 to scroll to (i.e., to select) ITEM2. The selected ITEM2 is shown at 706 highlighted by a rectangular line. The "DOWN" command is symbolically shown in FIG. 7 as icon 705. After the user selects ITEM2 for playback the user has to issue another PLAY command in order to actually play ITEM2. Therefore, at time T4 the user sends a second user input (i.e., a second "PLAY" command), this time to storage device 110, in order to instruct storage device 110 to play ITEM2. The second PLAY command is symbolically shown in FIG. 7 as icon 707.

During the time elapsing from time T4 to time T5 storage device 110 plays back menu item ITEM2 (as shown at 708) by incorporating (i.e., concatenating) a second video stream corresponding to or associated with played back menu item ITEM2, into the first video stream of or associated with video frame 704. As explained above, second PLAY command 707 is sent to storage device 110 and ignored by host 120. Therefore, host 120 does not "know" that menu item ITEM2 has been selected for playback, nor does it know that ITEM2 is currently played back. As far as host 120 is concerned, it is still playing back the file of or associated with Main Menu 702.

At time T5 playback of ITEM2 is completed and storage device 110 automatically resumes the repeated transfer of video frame 704 to host 120. The repeated transfer of video frame 704 to host 120 is shown at 704'. While video frame 704' is displayed, the user can select and play another item (e.g., ITEM3) in the same way as ITEM2.

Storage device 110 may also have a configuration that complies with any memory (e.g. flash memory), memory stick, memory card format (e.g. Secure Digital (SD) memory card format) and/or portable hard drive used for storing digital media such as audio, video, and/or picture files. Storage device 110 may also have a configuration that complies with a multi media card (MMC) memory card format, a compact flash (CF) memory card format, a flash PC (e.g., ATA Flash) memory card format, a smart-media memory card format, a USB flash drive, a USB external hard drive, or with any other industry standard specification.

With a suitable interface connection storage device 110 may also have a configuration complying with a High Capacity SIM ("HCS") memory card format. The HCS memory card format is a secure, cost-effective and high-capacity storage solution for the increased requirements of multimedia handset, typically configured to use a host's network capabilities and/or other resources, to thereby enable network communication.

Storage device 110 may be or include a volatile memory (such as Random Access Memory (RAM)) that is operable when power is maintained, or a nonvolatile memory that retains its memory or stored state even when power is removed. The storage device may also apply to other erasable programmable memory technologies, including but not-limited to electrically-erasable and programmable read-only memories (EEPROMs), EPROM, MRAM. The configuration of storage device 110 does not depend on the type of (removable) memory, and may be implemented as any type of memory, whether it is a flash memory or another type of memory. The storage device may also be implemented as a one-time programmable (OTP) memory chip and/or as a 3-dimensional memory chip technology.

A host with which such storage device is used may include a cellular telephone, a personal computer, a notebook computer, a handheld computing device, a camera, an audio reproducing device, and any other electronic device that requires data storage and is capable of playing video content. Flash EEPROM systems are also utilized as bulk mass storage for host systems. The storage device may be connected to or plugged into a compatible socket of a PDA (Personal Digital Assistant), mobile handset, and other various electronic devices. A PDA is typically known as user-held computer system implemented with various personal information management applications, such as an address book, a daily organizer, and electronic notepads, to name a few.

As will be appreciated by those familiar in the art, current devices employ a wide variety of different architectures and it is expected that new architectures will continue to be developed. In general, the exemplary embodiments may be employed in conjunction with any suitable type or number of storage devices, provided that the used storage device has suitable interface connections and suitable storage capabilities.

The embodiments, various examples of which are described herein, may be realized in hardware, software, firmware or any combination thereof. A typical combination of hardware and software could be a general purpose computer system with a computer program that, when loaded and executed, controls the computer system such that it carries out the steps, methods and procedures described herein. The present invention can also be embedded in a computer program product, which comprises all the features enabling the embodiments described herein, and which, when loaded in a computer system is able to carry out these embodiments. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A storage device to provide a video stream to a host, the storage device comprising:
   a memory to store a plurality of video files and a virtual root directory that identifies fewer than all of the plurality of video files;
   a user interface to receive user input from a user;
   a host interface to communicate with a host; and
   a controller operatively connected to the memory, the user interface, and the host interface, the controller being configured to:
      send the virtual root directory to the host, via the host interface, for use by the host in generating and displaying a main menu, the main menu including one or more main menu items;
      generate one or more video frames depicting a content selection menu, the content selection menu including one or more content selection menu items, wherein a particular content selection menu item corresponds to a particular stored video file that is not identified by the virtual root directory;
      in response to a host request for video data related to a first main menu item selected from the one or more main menu items, send to the host a first video stream including the one or more video frames depicting the content selection menu
      receive user input, via the user interface, corresponding to a user selection of the particular content selection menu item; and
      after receiving the user input, send to the host, in response to the host request for data related to the first main menu item selected from the one or more main menu items, via the host interface, a second video stream, the second video stream including content of the particular stored video file corresponding to the particular content selection menu item.

2. The storage device as in claim 1, wherein the memory further stores a second root directory that identifies more video files than the virtual root directory.

3. The storage device as in claim 1, wherein the controller is further configured to, responsive to receiving user navigation input:
   generate one or more second video frames, the one or more second video frames representing a graphical presentation of a modified content selection menu; and
   send the one or more second video frames to the host.

4. The storage device as in claim 1, wherein one of the one or more main menu items references a training file in the memory, and wherein the controller is further configured to use the training file to generate and store at the memory a training table that associates signals received at the user interface to remote control commands associated with a remote control that is operable to control both the host and the storage device.

5. The storage device as in claim 1, wherein a second main menu item of the one or more main menu items references a selection menu distinct from the content selection menu, wherein the controller is further configured to:
   generate one or more second video frames depicting the selection menu, the selection menu including one or more selection menu items, wherein a particular selection menu item corresponds to a service file stored at the memory; and
   in response to a host request for second video data related to the second main menu item, send to the host, a third video stream including the one or more second video frames depicting the selection menu.

6. The storage device as in claim 5, wherein one of the service files is a training file, and wherein the controller is further configured to use the training file to generate and store a training table that associates signals received at the user interface to remote control commands associated with a remote control that is operable to control both the host and the storage device.

7. The storage device as in claim 5, wherein the controller is further configured to:
   receive a second user input, via the user interface, the second user input corresponding to selection of the particular selection menu item that corresponds to the service file; and
   in response to receipt of the second user input, send to the host, via the host interface, a fourth video stream in response to the host request, the fourth video stream including content of the service file corresponding to the particular selection menu item.

8. The storage device as in claim 1, wherein the controller is further configured to determine a host type of the host and to determine contents of the virtual root directory based on the host type of the host.

9. The storage device as in claim 1, wherein the controller is further configured to automatically, after playback of the particular stored video file is completed, send to the host in response to the host request the first video stream including the one or more video frames depicting the content selection menu.

10. The storage device as in claim 1, wherein the controller provides the particular stored video file to the host responsive to receiving a password via the user interface.

11. The storage device as in claim 10, wherein the password is used per video file, per group of video files, or per user of the host.

12. The storage device as in claim 1, wherein the storage device is a Universal Serial Bus (USB) flash drive.

13. The storage device as in claim 1, wherein the user input interface includes a wireless communication interface.

14. The storage device as in claim 1, wherein the host request for the video data is received from the host in response to the host receiving a command from a remote control device associated with the host, and wherein the user interface is configured to receive the user input by detecting signals sent by the remote control device.

15. A method to provide a video stream to a host, the method comprising:
at a storage device coupled to a host capable of playing back video content, the storage device including:
a memory to store content, the content including a plurality of video files;
a user interface to receive user input;
a host interface to communicate with the host; and
a controller operatively connected to the memory, the user interface, and the host interface,
performing:
sending a root directory from the controller to the host, via the host interface, for use by the host in generating and displaying a main menu, the main menu including one or more main menu items;
generating, at the storage device, one or more video frames depicting a content selection menu, the content selection menu including one or more content selection menu items, wherein a particular content selection menu item corresponds to a particular stored video file of the plurality of video files;
in response to a host request for video data related to a first main menu item selected from the one or more main menu items, sending to the host a first video stream including the one or more video frames depicting the content selection menu;
receiving user input, via the user interface of the storage device, corresponding to a user selection of the particular content selection menu item; and
in response to receipt of the user input, sending to the host, via the host interface, a second video stream in response to the host request, the second video stream including content of the particular stored video file corresponding to the particular content selection menu item.

16. The method as in claim 15, wherein sending to the host the first video stream includes repeatedly transferring to the host a video frame depicting the content selection menu.

17. The method as in claim 15, further comprising concatenating the second video stream to the first video stream.

18. The method as in claim 15, further comprising determining a host type of the host, wherein the controller determines contents of the root directory based on the host type of the host.

19. The method as in claim 15, further comprising receiving a password through the user interface, and wherein the second video stream is sent to the host when the password indicates that the user is authorized to access the particular stored video file.

20. A storage device, comprising:
a memory to store content; and
a controller operatively coupled to the memory, the controller configured to:
when the storage device is connected to a host:
send a root directory to the host to initiate a display of one or more menu items;
send to the host, in response to a host request for video data corresponding to a selected menu item of the one or more menu items, a first video stream that includes a plurality of repeated video frames depicting a content selection menu including one or more content selection menu items;
receive user input corresponding to a user selection of a particular content selection menu item from the content selection menu; and
in response to receipt of the user input, send to the host a second video stream in response to the host request, the second video stream including content of a video file referenced by the particular content selection menu item.

21. The storage device of claim 20, wherein the storage device is a Universal Serial Bus (USB) flash drive.

* * * * *